United States Patent [19]

Rzad et al.

[11] Patent Number: 4,650,555

[45] Date of Patent: Mar. 17, 1987

[54] METHOD FOR CORONA DISCHARGE ENHANCED FLUE GAS CLEAN-UP

[75] Inventors: Stefan J. Rzad, Rexford; David W. Tong, Schenectady, both of N.Y.

[73] Assignee: General Electric Company, Schenectady, N.Y.

[21] Appl. No.: 783,583

[22] Filed: Oct. 3, 1985

[51] Int. Cl.⁴ ............................................. C01B 21/30
[52] U.S. Cl. ..................................... 204/174; 204/177
[58] Field of Search .................... 204/164, 174, 177; 55/2; 423/DIG. 10

[56] References Cited

U.S. PATENT DOCUMENTS

| | | | |
|---|---|---|---|
| 3,205,162 | 9/1965 | MacLean | 204/312 |
| 3,601,313 | 8/1971 | Berg | 55/2 |
| 4,110,183 | 8/1978 | Furuta et al. | 204/157 |
| 4,162,144 | 7/1979 | Cheny | 55/2 |
| 4,313,739 | 2/1982 | Douglas-Hamilton | 55/2 |
| 4,367,211 | 1/1983 | Ray | 423/569 |
| 4,372,832 | 2/1983 | Bush | 204/157.1 |
| 4,416,748 | 11/1983 | Stevens | 204/157.1 |

FOREIGN PATENT DOCUMENTS 61-08514  8/1981  Japan ................................... 204/179

OTHER PUBLICATIONS

"Electric Field Effects on Unit Operations-Charged Aerosols for Air Purification & Other Uses"-American Inst. Of Chem. Engineers-Sixth Ninth Natl. Mtg.-May 16-19, 1971, pp. 1-50.

Ion-Induced Nucleation from Sulfur Dioxide-G. L. Diamond, V. Iribarne & D. J. Corr-J. Aerosol Sci., vol. 16, No. 1, pp. 43-55, 1985.

"The Effect of Electric Fields on the Absorption of Pure Sulfur Dioxide by Water Drops"-T. E. Carleson & J. C. Berg, Chemical Engineering Science, vol. 38, No. 6-pp. 871-876, 1983.

"Mass Transfer of Sulfur Dioxide to Growing Droplets"-Role of Surface Electrical Properties-Michael J. Latteson & Philip J. Giardina-School of Chem. Eng., George Inst. of Tech., pp. 50-55.

"Sulfur dioxide Conversion Under Corona Discharge Catalysis"-by W. R. Browne & E. E. Stone-Mar. 5, 1965.

"Doe's Electron-Beam Irradiation Developmental Program, E. C. Traxler, pp. 1-14.

"Corona Discharge Oxidation of Sulfur Dioxide"-M. J. Matteson, H. L. Stringer & W. L. Busbee-School of Che. Eng. Georgia Inst. of Tech. pp. 895-901.

Primary Examiner—Howard S. Williams
Attorney, Agent, or Firm—Bernard J. Lacomis; James C. Davis, Jr.

[57] ABSTRACT

A process for removing pollutants including sulfur dioxide and/or nitrogen oxides from effluent gas which relies on the use of corona discharge to enhance the efficiency of the process. In one embodiment, corona discharge is utilized in a conventional spray dryer. In another it is combined with an ammonia injection technique. In yet another embodiment corona discharge treatment is followed by exposing the acidic mist byproduct leaving the discharge treatment chamber to a neutralizing reagent directed into the path of the effluent. The reagent may be provided with an electrical charge opposite to that on the acidic mist byproduct emerging from the corona reaction chamber to enhance neutralization.

12 Claims, 4 Drawing Figures

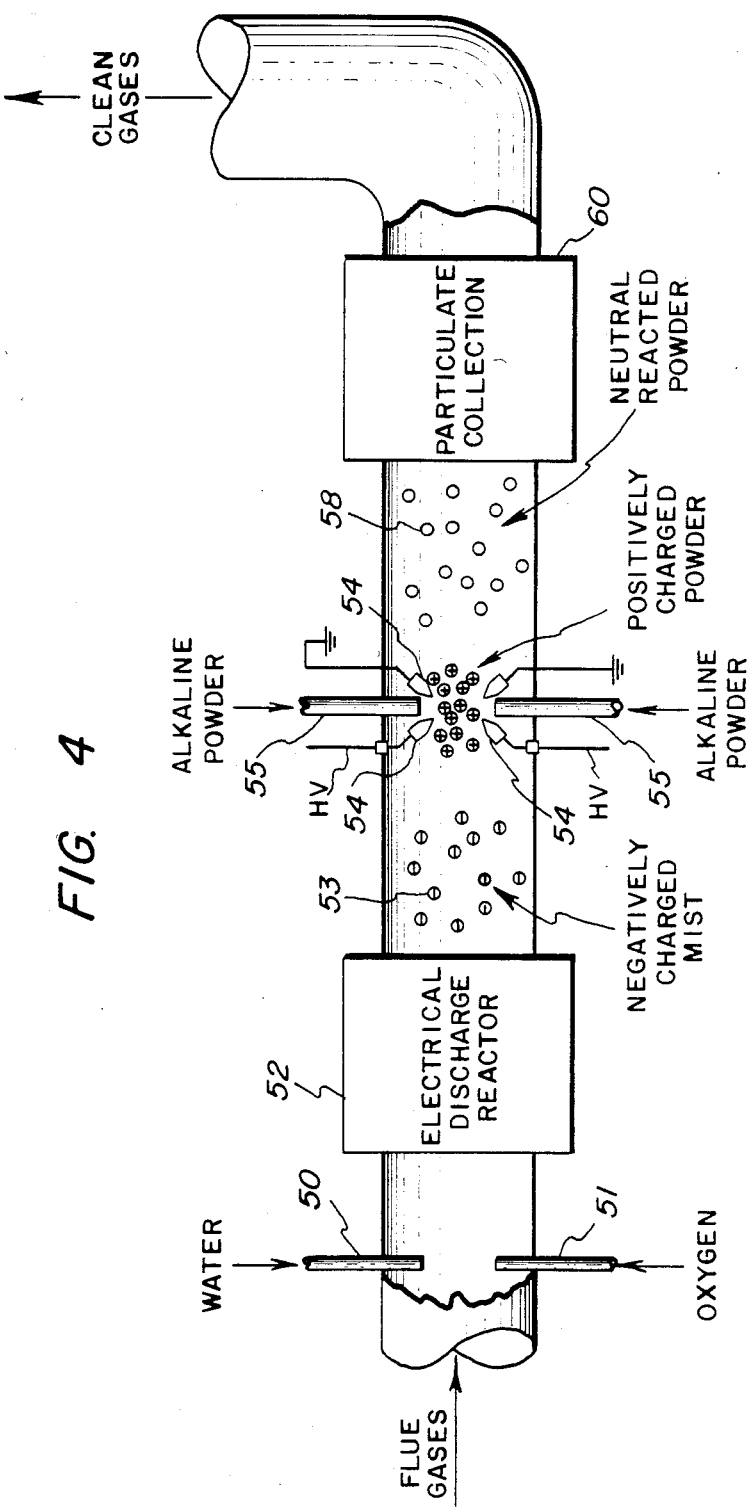

METHOD FOR CORONA DISCHARGE ENHANCED FLUE GAS CLEAN-UP

BACKGROUND OF THE INVENTION (1) Field of the Invention

The present invention relates to an improved process for removing pollutants, especially sulphur dioxide and nitrogen oxides, from effluent gases resulting from various chemical processes and by the combustion of carbonaceous fuels. This invention relates to treating effluent gases so that these pollutants may be changed into particle form or mist form, thereby enabling collection of the particles or mist pollutants by conventional collecting means such as precipitators, filters and the like. Specifically, the invention relates to the combination of corona discharge treatment with previous processes known to provide for the removal of sulphur dioxide and nitrogen oxide from such fuels.

(2) Description of the Prior Art

The need to deal with the deleterious effects of emissions generated from various sources such as industrial processes and energy production of various kinds is well known. The impact of such emissions on human health has recently been the subject of intense study and public debate, and legislative action to mandate safer emissions has already been taken and will probably be enlarged or extended in the future. The "acid rain" controversy has, of late, focussed the public's attention on the effects of such emissions on the natural environment and promises to provide a continuing debate over the causes of water pollution and appropriate legislative action that should be taken to curtail such pollution. The main emissions identified as having such adverse effects are various forms of nitrogen oxides ($NO_x$) and sulphur dioxide ($SO_2$). Other byproducts of the energy creation process such as particulates are of less concern since known (albeit expensive) methods are available for their removal.

Each of the above problems forces the public to choose between the present and relatively cheap methods for producing energy and chemicals on the one hand, and increasing the cost of such production and processes by either changing to a different energy production process or altering current processes by the addition of equipment designed to remove such pollutants.

In response to the above, several methods and apparatus have been developed to minimize the sulphur dioxide pollution caused by the burning of carbon fuels. Typically, such methods and apparatus are costly and have large operating and maintenance problems.

The prior art has included various methods for removing the above noted contaminants from the energy production process. One such technique is referred to as the spray drying process. In the spray drying process, a mixture of water and alkali reagent such as lime is injected into the stream of effluent gases in a reaction chamber resulting in the formation of solid products from the reaction between the reagent and the pollutants. From the chamber the effluent gases pass into a particulate collection means such as a fabric or bag filter or an electrostatic precipitator whereat the solid particles of the reaction between the reagent and the pollutants are removed. The purified effluent gases are passed into a stack from which they are discharged after passing through the particulate collection means.

In order to operate the spray drying process most efficiently, large amounts of alkali reagent are needed, but such large amounts of reagent require correspondingly large amounts of water to operate properly. For this reason methods for increasing the efficiency of the spray drying process which do not require the use of additional amounts of reagent are desirable.

Another type of prior art pollution control system utilizes radiation in various forms to improve the efficiency of the process. Such systems use electron beam or ultraviolet light to oxidize the nitrogen oxides and sulphur dioxides in the effluent gases. The ionization caused by the electron beam irradiation converts the sulphur dioxide and nitrogen oxides to acid mist at low temperatures and/or solid particles at high temperatures (in the presence of ammonia) which latter byproducts are removed in a conventional manner for later disposition. In the electron beam method, costly and elaborate shielding measures must be employed.

OBJECTS AND SUMMARY OF THE INVENTION

A primary object therefore is to provide any improved method and apparatus for removing pollutants from effluent gases before releasing them into the atmosphere.

Another object of the invention is to provide an improved technique for removing sulphur dioxide and nitrogen oxides from effluent gases resulting from the burning of carbonaceous or other fuels or from other commercial or industrial processes.

A further object of the invention is to improve efficiency and usefulness of the spray drying process applicable to high sulphur content coals.

A further object of the present invention is to combine the use of a corona discharge treatment of the effluent gases with the conventional spray drying process so as to increase the efficiency and effectiveness of the spray drying process.

Yet another object of the invention is to provide an air pollution control system having a spray dryer which incorporates a corona discharge device in the same reaction chamber to thereby improve the efficiency and compactness of the treatment process.

An additional object is to improve the neutralization of acidic mist byproducts produced by a corona discharge enhanced reaction by subjecting such byproducts to the action of liquid or dry neutralizing reagent after they exit from the corona discharge reaction chamber.

An additional object is to improve the efficiency of the process for neutralizing acidic byproducts produced in a corona discharge reaction chamber by precharging the alkali reagent with a polarity opposite to that of the acidic mist byproducts in order to promote a more rapid interaction.

The above and other objects of the invention are accomplished by delivering effluent gases into a spray dryer type reaction chamber while concurrently subjecting the effluent gases in the chamber to a corona discharge thereby improving the compactness and efficiency of the spray drying treatment process.

A further embodiment of the invention comprises a process including the steps of first injecting ammonia into the contaminated effluent flue gases followed by injection of the resulting gas mixture into a corona discharge chamber. The effluent gas emanating from the corona discharge reaction chamber are in the form of particulates which are collected by conventional means prior to emitting the cleaned flue gases to the atmosphere.

Yet another embodiment of the invention provides for the use of a corona discharge reaction chamber in which the sulphur dioxide contaminants are converted into an electrically charged acidic mist which is then subjected to a neutralization treatment step at which the alkali reagent, in either liquid or powder form, is first charged oppositely to the mist then made to combine with the mist emanating from the corona discharge reactor. The neutralizing reagent may be electrically charged prior to intermingling with the acidic mist, with a polarity opposite to that of the mist to further improve the neutralization process. The latter arrangement permits more efficient neutralization of the acidic mist prior to collection and disposal.

BRIEF DESCRIPTION OF THE DRAWINGS

These and other features of the present invention and attendant advantages will be readily apparent to those having ordinary skill in the art and the invention will be more easily understood from the following detailed description of the preferred methods and embodiments of the present invention taken in conjunction with the accompanying drawings wherein:

FIG. 4 illustrates an implementation wherein oppositely charged alkaline reagent is impinged into contact with charged mist emanating from a corona discharge reactor to enhance the neutralization process.

DESCRIPTION OF THE PREFERRED METHOD AND EMBODIMENT

Figure 1:
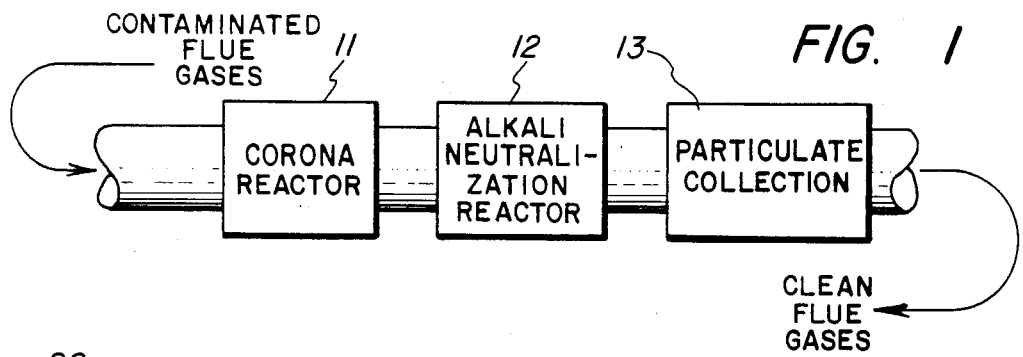
FIG. 1 shows the general processing steps of the invention.

Referring to FIG. 1, there is shown a generalized layout in block form of a typical treatment system according to the invention. As shown in FIG. 1, contaminated flue gases are first fed into a corona reactor 11 wherein the flue gases are exposed to reactive species generated by the corona reactor. The reactive species generated within the corona reactor lead to the oxidation of the $NO_x/SO_x$ contaminants into nitric and sulphuric acids. The nitric and sulphuric acids are then fed to a neutralization reactor 12 in which the nitric and sulphuric acids are neutralized by the addition of suitable bases, for example, ammonia or lime. From the neutralization reactor, the effluent gases pass into a particulate collection means 13 such as a fabric filter or electrostatic precipitator, whereat the solid products emanating from the alkaline neutralization reactor are removed. As illustrated in FIG. 1, the purified effluent gases passing out of the collection means 13 are discharged into the atmosphere through any appropriate means such as a stack. Although in accordance with the general layout of FIG. 1, the corona reactor and alkaline neutralization reactor are shown as separate chambers, it is possible that the reactions brought about within each of the above-noted reactors may be carried out in a single reactor by injecting the combination of ingredients thereinto.

Figure 2:
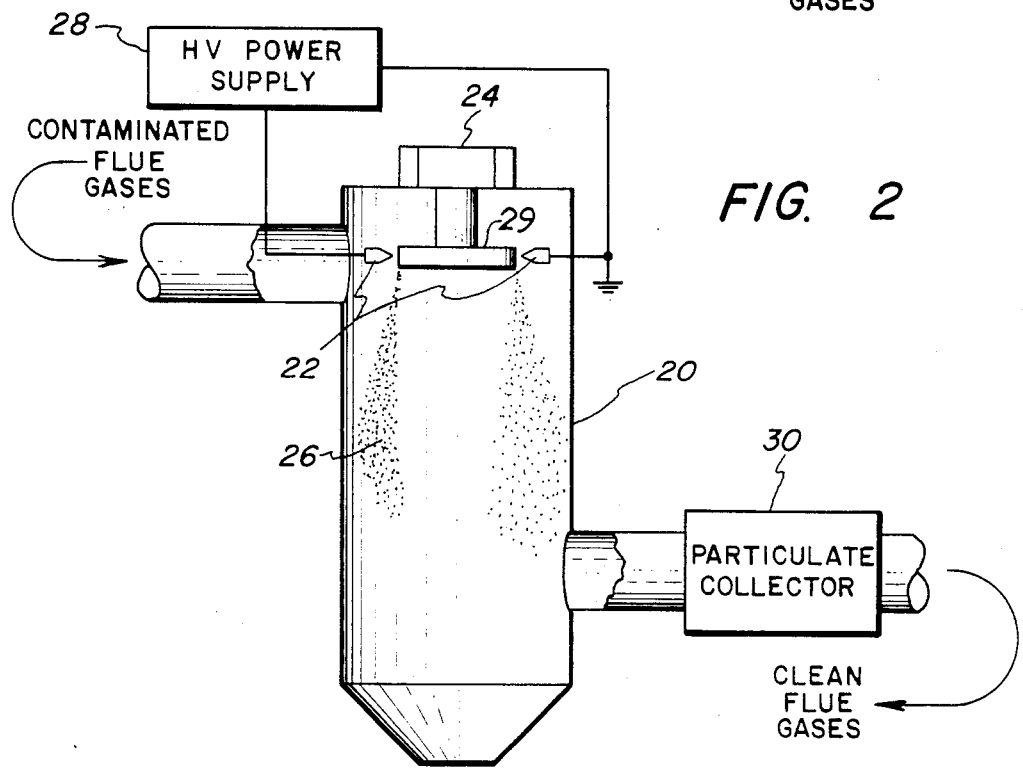
FIG. 2 shows an implementation of the invention in which corona discharge electrodes are included in the spray drying reaction chamber.

One such arrangement may be seen in diagrammatic form in FIG. 2. Referring to FIG. 2, there is shown an arrangement which combines the aforediscussed spray drying process with corona treatment to perform the cleanup of contaminated gases in an efficient manner. In FIG. 2, combustion gas containing the $SO_x$ and $NO_x$ is fed from the boiler or some such other typical carbon fuel combustion apparatus into a conventional spray drying reactor 20. As is conventional in the spray drying process, a reagent such as lime, limestone, sodium compounds, magnesium compounds or mixtures thereof is combined with water to form a slurry by means of a mixing means 24. This slurry is then sprayed or directed by means of a directing means 29 in the reactor in a manner such that the contaminated flue gases flowing into reactor 20 are made to intermingle with or contact the slurry mixture. The sulphur dioxide and nitrous oxides in the contaminated flue gases react with the reagent slurry in a conventional manner as in prior art processes. The reactions that take place in such chamber are well known and may be briefly described immediately below as follows:

CORONA PRODUCTION OF OXIDIZING SPECIES

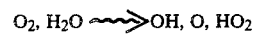

ACID FORMATION

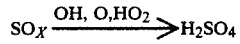

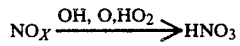

NEUTRALIZATION

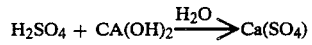

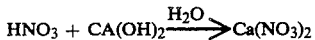

However, unlike the prior art processes, the reaction taking place in the spray drying reactor 20 is also influenced by a corona discharge environment produced concurrently within the reactor chamber. The corona discharge atmosphere is developed in any conventional manner by either a single pair of electrodes or various pairs of electrodes of conventional configuration. The overall aim is to envelop with corona a substantial portion of the reaction volume between the contaminated gases and the slurry to thereby render more efficient the conversion of the contaminants and flue gases to removable form. The corona discharge could, of course, be produced by DC or AC electrical voltages from a source 28 applied across appropriate electrodes 22 positioned within or about the path of the flue gases. The geometries of these gaps and placement of electrodes would, of course, be optimized for the specific geometry of the reaction chamber in which they were to be employed. Either uniform or nonuniform electric field configurations could be employed to optimize the efficiency of the conversion process. As with other prior art conventional techniques, the corona discharge would generate reactive species, both neutral and ionic, which lead to the formation of nitric and sulphuric acids which are then neutralized by the base present in the reactor slurry. Some of the more important of such reactive species referred to above are:
NEUTRAL

IONIC $SO_3^-$, $HSO_3^-$, $O^-$, $OH^-$, $HO_2^-$, $NO_2^-$

It is the reactive species which are, in large measure, responsible for the improved efficiency of the process by combining with or enhancing reactions of the pollutants to safer or removable forms.

There are several advantages possessed by the use of corona discharge in the reaction chamber as shown in FIG. 2 as contrasted to prior art electron beam or light induced reactions. Firstly, corona discharge chemistry is energetically more efficient because energy put into a molecule is less likely to be squandered in light emission as compared to the use of radiation to bring about a similar result. This is due to the fact that in discharges most of the reactive species are excited to optically forbidden levels; thus they survive long enough without losing energy by luminescence so that they can enter into chemically significant interactions. Secondly, the corona discharge technique is not limited by the very stringent radiation protection requirements usually required in some of the more conventional techniques. Thirdly, the equipment for producing the corona discharge is relatively inexpensive and the process itself is quite well understood since it is used in a large number of other applications. The equipment conventionally used in such other applications would, for the most part, be applicable to use in the environment of the invention.

Figure 3:
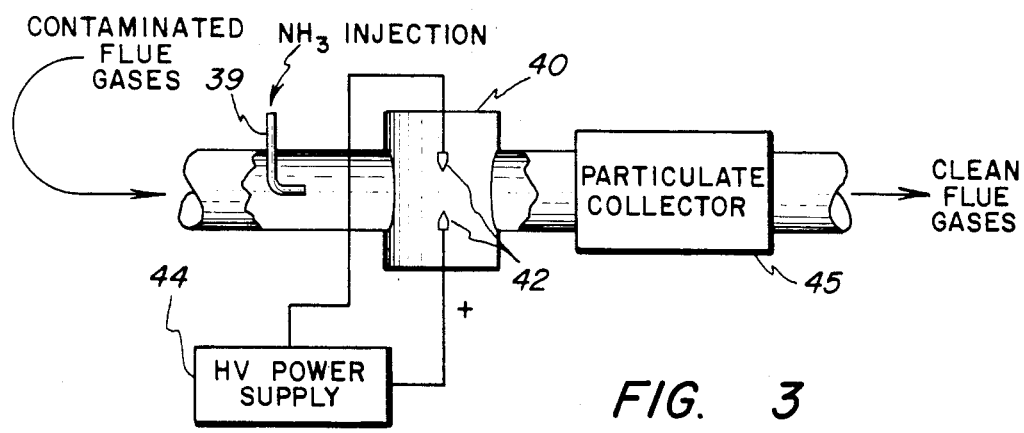
FIG. 3 shows an implementation which includes ammonia injection followed by corona treatment of effluent gases.

Another embodiment of the invention is shown in FIG. 3 in which a corona discharge reactor is used to provide oxidation of sulphur dioxide and nitrogen oxides in an otherwise conventional ammonia injection process. Referring to FIG. 3, the contaminated flue gas entering the treatment system is first injected with ammonia at an inlet 39. Water also may be injected at this stage in order to cool the incoming gas and to bring the concentration of water in the gas to be treated to within an acceptable range for the ensuing reaction. The cooled mixture is then fed to a corona discharge reactor 40 wherein the contaminated flue gas and ammonia mixture is brought into contact with the corona discharge in the reactor 40. The reactive species produced by the corona discharge in the process of FIG. 3 comprise the same species identified herein before with respect to the process of FIG. 2 but, in addition, include $NH_2$, $NH_3^+$, and $NH_4^+$. The corona discharge is produced in a manner similar to that discussed above in connection with FIG. 2 by providing suitable electrodes 42 which are energized from a high voltage power supply 44. The configuration of electrodes 42 is such that the reactive species generated by the corona discharge are brought into good contact with the incoming ammonia and contaminated flue gas mixture. The reactive species generated by the corona discharge then act within the reactor 40 to oxidize the $SO_x$ and $NO_x$ to sulphuric and nitric acids. Subsequent neutralization reactions take place within the reactor 40 between the acids, ammonia and water vapor to form ammonium sulphate and ammonium sulphate nitrate. A generalized description of the reaction according to the embodiment of FIG. 3 is as generally diagrammed below.

CORONA PRODUCTION OF OXIDIZING SPECIES

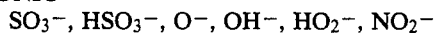

ACID FORMATION

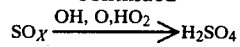

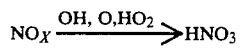

NEUTRALIZATION

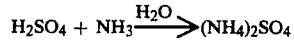

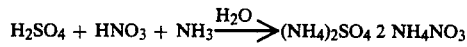

The gas emanating from the reactor 40 is then subjected to a particulate collection process in which the solid particles are collected for disposition. The remaining clean flue gases are discharged to the atmosphere in a conventional manner.

FIG. 4 shows yet another embodiment of the invention which uses corona discharge not only to generate a reactive species for oxidizing sulfur dioxide in flue gas but also selectively charging an alkali reagent for more efficient neutralization of the acid generated in the above reaction. Referring to FIG. 4, contaminated flue gases entering the system may first be enriched by the addition of water and oxygen, if needed, and then passed through a corona discharge reactor 52. As noted before with respect to the other embodiments, the corona discharge is produced by DC or AC electrical energy with conventional means, the electrode geometry having been optimized for maximum reaction in the reactor chamber 52. When a mixture of $O_2$, $H_2O$, and $SO_2$ is passed through an electrical discharge as shown in FIG. 4, various active species are generated leading to the oxidation of $SO_2$ to $SO_3$ or $HSO_3$, similar to the previously described embodiments. These species then proceed to react with water to give sulphuric acid which rapidly forms condensation nuclei. Depending on the relative humidity, the nuclei will grow into droplets forming an acid mist 53. The acidic mist 53 exiting from the discharge reactor has an electrical charge, the sign of which is dependent on the nature of the discharge in the reactor 52. The acidic mist 53 is brought into contact with an alkaline powder such as $Ca(OH)_2$ or $Na_2CO_3$ which is injected into the airstream via inlet means 55. Appropriately placed corona electrodes 54 impart an electrical charge to the alkaline powder entering into contact with the mist 53. The effect of such charging of the alkaline powder results in a more efficient neutralization of the acidic mist 53. The charging electrodes 54 may take on a variety of configurations and shapes to accomplish the above-noted charging of particles of the alkali reagent powder and conventional techniques and equipment for providing such charge are readily available. By virtue of the arrangement of FIG. 4, the negatively charged acidic mist emanating from the reactor 52 is neutralized and passed to a particulate collection means 60 whereat the solid particles are removed from the airstream. The clean gases are then allowed to exit to the atmosphere in a conventional manner. It should be understood that in connection with the embodiment of FIG. 4, the alkaline material fed through the inlet 55 may be either in wet or dry form.

The foregoing describes apparatus and methods for cleaning up contaminated flue gas by the use of corona discharge in combination with several conventionally used process steps. The corona discharge reaction provides a means for improving the efficiency and cost of these prior art methods.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A process for removing pollutants including sulfur dioxide and/or nitrogen oxides from effluent gas comprising the steps of:
   (a) delivering the effluent gas into a spray dryer chamber;
   (b) forming liquid and reagent into a spray in said chamber and effluent gas in said chamber while concurrently subjecting said effluent gas to a corona discharge whereby the sulfur oxide and/or nitrogen oxides in said effluent gas are converted into mist and/or solid particles; and
   (c) collecting said mist and/or solid particles.

2. The process recited in claim 1 wherein said reagent is a member of the group consisting of:
   lime,
   limestone,
   sodium compounds,
   magnesium compounds, or mixtures thereof.

3. The process of claim 2 wherein the effluent gas is the combustion gas from the burning of a carbonaceous fuel.

4. The process of claim 2 wherein the effluent gas is the combustion gas from the burning of coal.

5. The process recited in claim 1 wherein said corona discharge is developed by the application of high electrical voltages between electrodes in said chamber.

6. The process recited in claim 5 wherein said high voltages are DC or AC.

7. A process for removing pollutants from effluent gas comprising the steps of;
   (a) delivering said effluent gas into a reaction chamber;
   (b) subjecting said effluent gas in said reaction chamber to corona discharge to produce reactive species of the type required to transform said pollutant gases to acidic mist, said mist leaving said chamber carrying a net electrical charge of a first polarity;
   (c) intermixing a neutralizing reagent with said mist downstream of said chamber to thereby neutralize said mist, said reagent being provided with an electrical charge opposite to that carried by said mist; and
   (d) collecting and disposing of the product of the reaction between reagent and mist.

8. The process recited in claim 7 wherein said corona discharge is developed by the application of high electrical voltages to electrodes located in said chamber.

9. The process of claim 7 wherein said pollutant is sulfur dioxide.

10. The process of claim 7 wherein said reagent is charged by means of high voltage electrodes located downstream from said chamber.

11. The process of claim 10 wherein said reagent is a dry powder.

12. The process of claim 10 wherein said reagent is in the form of liquid droplets.

* * * * *